E. J. SCHAFER.
FILM MENDING MACHINE.
APPLICATION FILED OCT. 26, 1911.
1,044,258.
Patented Nov. 12, 1912.
2 SHEETS—SHEET 1.
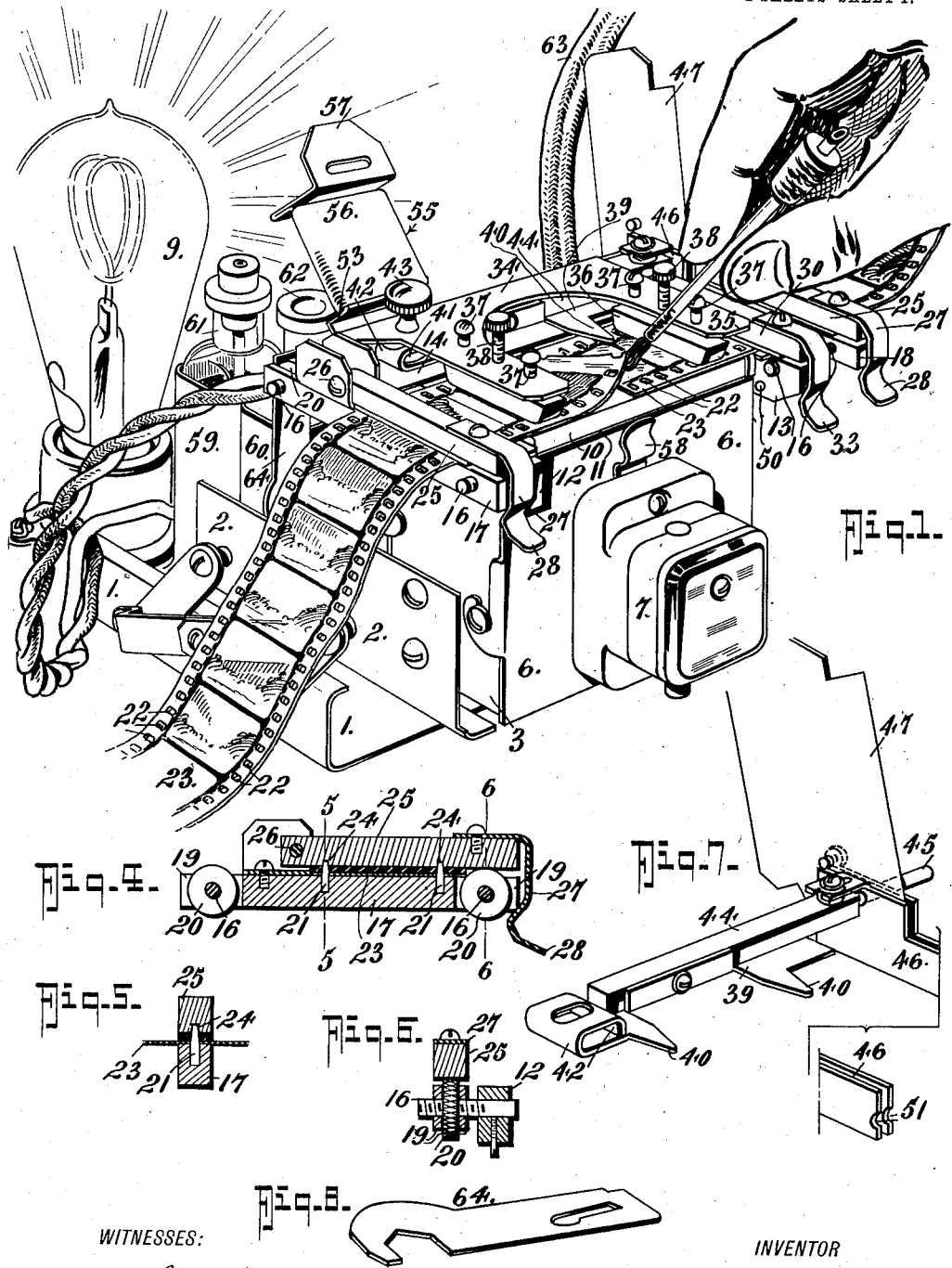
WITNESSES:
John J. Schrott
Robert M. Grunwell
INVENTOR
Edward J. Schafer.
BY
Fred G. Dieterich & Co
ATTORNEYS E. J. SCHAFER.
FILM MENDING MACHINE.
APPLICATION FILED OCT. 26, 1911.
1,044,258.
Patented Nov. 12, 1912.
2 SHEETS—SHEET 2.
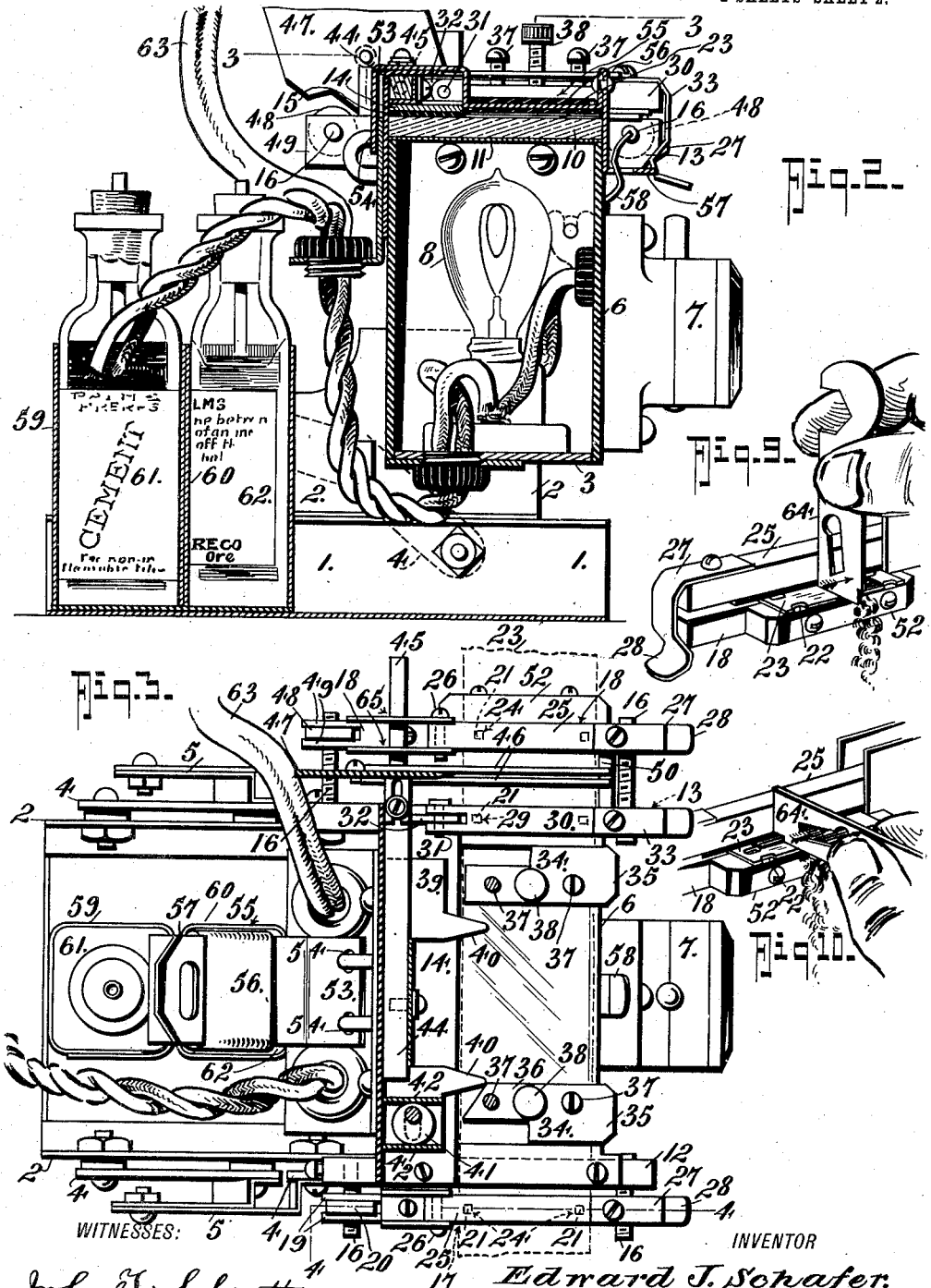
WITNESSES:
John J. Schrott
Robert M. Grunwell
INVENTOR
Edward J. Schafer.
BY
Fred G. Dieterich
ATTORNEYS

UNITED STATES PATENT OFFICE.

EDWARD J. SCHAFER, OF SEASIDE, OREGON.

FILM-MENDING MACHINE.

1,044,258.

Specification of Letters Patent.

Patented Nov. 12, 1912.

Application filed October 26, 1911. Serial No. 656,853.

*To all whom it may concern:*

Be it known that I, EDWARD J. SCHAFER, residing at Seaside, in the county of Clatsop and State of Oregon, have invented a certain new and useful Improvement in Film-Mending Machines, of which the following is a specification.

My invention is a machine for use in mending or repairing moving picture films and the like. In the art of moving picture displaying, the pictures are contained on a long strip or film in successive arrangement. The film is perforated along its longitudinal edges with suitably spaced sprocket perforations that engage the sprocket wheels of the exhibiting machine, and are thereby fed before the condenser lenses to enable the images to be projected with the light stream on to the screen and thus produce the view. It sometimes occurs that in winding or rewinding the films on the reels or when running films through projecting machines, etc., the film becomes torn or broken making it necessary to repair the same and rejoin the severed ends before the film can be used again. To do this requires that the film be scraped, and the torn edges trimmed down evenly so that a perfect joint and perfect registration of the perforations may be obtained. This operation is usually both long and tedious and usually requires the whole attention of the operator.

It is, therefore, one of the principal objects of my invention to provide a machine capable of manipulation of one hand if desired, while the operator's other hand is employed in turning the exhibiting or projecting machine; and by the use of which machine a perfect mend may be easily and conveniently made without delay.

My invention primarily resides in providing a repairing machine that may be attached to any rewinding machine, and in such a manner as to lie out of the way when not in use, and so that it may be swung out into the path of the film whenever it is desired to employ the machine.

The invention includes a transparent plate or table on which the film is laid in operating on the same and beneath which a source of illumination is located with a transparent sheet of mica between the source of illumination and the glass table top to prevent heating and subsequent injury to the film; clamps having dowels or pins to enter the perforations and hold the film section in position; tension devices for holding the adjacent ends of the films on the table; a presser for holding the repaired parts down on the table until they have become firmly united; a gage for effecting the proper "match" of the two film sections; a cutting mechanism for trimming the torn ends of the film; means for insuring the proper relative position of the "line of severance", and a scraper for removing the emulsion from the film body or base preparatory to making the repairs.

The invention also resides in those novel details of construction, combination and arrangement of parts, all of which will be hereinafter fully described and then be specifically pointed out in the appended claims, reference being had to the accompanying drawings, in which:—

Figure 1 is a perspective view of the invention in use. Fig. 2 is a substantially central, vertical cross section of the machine, parts being shown in elevation. Fig. 3 is a horizontal section taken substantially on the line 3—3 of Fig. 2, the "joined" clamp being swung back. Fig. 4 is a detail section on the line 4—4 of Fig. 3. Figs. 5 and 6 are detail sections on the lines 5—5 6—6 respectively of Fig. 4. Fig. 7 is a detail perspective view of the line gage, the cutter carrying bar and the cutting mechanisms. Fig. 8 is a detail perspective view of the combined wrench and scraper. Figs. 9 and 10 are detail perspective views showing two methods of scraping the ends of films of different perforations.

In the drawings in which like numerals and letters of reference indicate like parts in all of the figures, 1 is the primary base which in practice, is relatively fixedly clamped to the base of the rewinding machine (not shown). 2 is the secondary base which carries the main frame or housing 3, and the bases 1 and 2 are joined together by parallel levers 4 and by holding braces or links 5, so arranged and constructed that the bases may be held one upon the other when the machine is not in use, and whereby they may be held in position when the housing is pulled forward to bring the table in alinement with the film.

The housing 3 has a removable front 6 which supports a switch 7 of any approved type, the switch 7 controlling the lights 8 and 9 which illuminate the inside of the housing and the outside of the apparatus. The front 6 is held in place by suitable fastenings.

The top of the light house 3 is formed of a transparent plate of glass 10 lined with a sheet of mica 11 to prevent heating of the glass top 10, which top is hereinafter termed "the table."

Securely mounted on the housing 3 to lie next to the table 10 is a frame composed of two side bars 12—13, united by a straight-edge plate 14 that crosses the table 10 longitudinally near its back edge, a sheet of rubber 15 being interposed between the straight edge 14 and the table top 10 to insure a tight contact therebetween.

Each bar 12 and 13 is provided with laterally projecting threaded rods 16 on which are the bodily movable clamp bars 17—18, the ends of which bars are bifurcated as at 19 to receive the adjusting nuts 20 by means of which the required adjustment of the clamp bars 17—18 are effected. Each bar 17 and 18 is provided with suitable spaced teeth or dowels 21 that project through the sprocket holes 22 in the films 23 and enter the recesses 24 in the respective hinged clamp bars 25, there being one bar 25 hinged at 26 to each bar 17 and 18. The bars 25 are retained in their clamping positions (see Fig. 4) by resilient clips 27 or other suitable devices. The clips 27 have finger engagements 28. The bar 13 is also a clamped bar but it has no lateral adjustment as has the bars 17 and 18. The bar 13 is also provided with teeth or dowels 21 to pierce the film sprocket holes 22 and enter the recesses 29 in the pivoted clamp 30 which is pivoted at 31 to a projection 32 and is clipped down by a suitable clip 33.

The bars 25—25 and 30 are each lined or faced on the underside with rubber or other similar yieldable substance to press on the film without injuring the same.

Mounted over the table top 10 between the clamps 17—25 and 13—30 is a U-frame 34, that is elevated above the table and supports below its arms 35 a pair of pressers 36, the same having guides 37 and being adjustable through tensions 38 as best indicated in Fig. 1. Mounted beneath the U-frame 34 and over the straight edge 14 is a gage 39 whose pointers 40 are spaced a definite distance apart, say two film spaces, and the gage 39 may be adjusted along the table by a cam 41 that operates between the abutments 42 on the gage 39 and is turned by a finger piece 43 (see Figs. 1 and 3). The gage 39 carries a bar 44 which has a finger 45 to project through bearings 65 on the clamp bar 18 and which carries a cutting mechanism which comprises a shear frame 46, formed of a pair of parallel plates spaced apart sufficiently to receive the knife 47.

The knife 47 is pivoted on the finger 45 on which the frame 46 is mounted. The frame 46 is adjustably secured to the bar 44 to move with it, by a set screw 48 and slotted projection 49. 50 is a guide rod projecting laterally from the bar 13 and on which the front of the shear frame 46 is guided, the rod lying in the recesses 51 of the frame 46.

The cutting mechanism 46—47 lies between the clamps 13—30 18—25.

52 is a block fastened to the bar 18 to serve as a support for the lap end of the film while it is being scraped clear of emulsion preparatory to mending the same; the clamp bar 25 which is adjacent to the block 52 serves as a straight edge or guide for the scraper to prevent scraping over the dividing line on the film, and in case the film is of such perforation as to project farther than flush with the straight edge of the side of the bar 25, the scraper is turned from the position shown in Fig. 9 to the position shown in Fig. 10, so that the notched corner will be adjacent to the bar 25.

53 is a joined clamp which is hinged at 54 to the housing and has a presser portion or foot 55 that is covered with rubber or the like 56, to press the repaired joint to the table top until the "mend" has become set. The joined clamp 53 has a portion 57 to be engaged and latched by the latch 58.

59 and 60 are the holders for the repairing cement containers 61 and 62.

63 indicates the leading-in wires from a source of current supply that deliver the current through the switch to the respective lights.

Operation: When the device is not in use, the base 2 rests on the base 1 in its backward position (see Fig. 2) so as to be out of way. When a film breaks the machine is pulled (see Fig. 1) to bring the table 10 in alinement with the film, the broken sections are clamped by the clamps 17—25 13—25, after which the gage 39 is adjusted to bring the cutting mechanism into proper position to sever the ragged end of the film sections. After the respective ends have been properly trimmed, the emulsion is scraped off the contacting face of the lap cut end of the film by using any suitable scraper 64 for the purpose. The two sections of the film are then adjusted in the clamps and on the table top so that the lapping end will lie on the table 10 as indicated in Fig. 1. Proper alinement being attained by use of the straight edge 14 and the pointer 40, the film ends are held down by the pressers 36. The cement is then applied to the lapping surfaces to cause them to adhere. The joint clamp 53 is then fastened down (see Fig. 2) to hold the joint firmly in place until the cement has set, after which the film is removed from the machine repaired. By using the gage, a cut or trim at an exact location can be made to insure absolute alinement of the lapped ends and perfect registry between the sprocket holes thereof. By making the parts adjustable as indicated any style of film may be employed regardless of the relative location between the sprocket perforations, the cross lines and the machine.

From the foregoing description taken in connection with the accompanying drawings it is thought the complete operation and advantages of my invention will be apparent to those skilled in the art, and I desire it understood that the form shown is a preferred one of which numerous modifications may be made by those skilled in the art without departing from the invention.

What I claim is:—

1. A film repairing machine including a table to receive the film parts that are to be repaired, and film holding clamps for retaining the film on the table in position to be mended, together with pressers for engaging the film sections on either side of the "break" and hold them down on the table.

2. A film repairing machine including a table to receive the film parts that are to be repaired, and film holding clamps for retaining the film on the table in position to be mended, together with pressers for engaging the film sections on either side of the "break" and hold them down on the table, together with a device for holding the mended part immovable until it has become "set".

3. In a film mending device, a housing having a transparent part forming a table, means for illuminating the interior of said housing, and a film holding device for retaining the film in position on the table while being repaired.

4. In a film mender, a table, devices for holding the film sections on the table in position to be mended, and gage and cutting mechanism coöperating with the film to trim the same.

5. In a film mender, a table, devices for holding the film sections on the table in position to be mended, and gage and cutting mechanism coöperating with the film to trim the same, together with means for holding the mended part until "set".

6. In a film mender, a table, devices for holding the film sections on the table in position to be mended, and gage and cutting mechanism coöperating with the film to trim the same, said table being transparent, and an illuminant beneath the table.

7. In a film mending device, a housing having a transparent part forming a table, means for illuminating the interior of said housing, and a film holding device for retaining the film in position on the table while being repaired, a cutting and trimming mechanism, and a gage coöperative therewith and with the film to effect the desired cut at the particular location.

8. In a film mender, a lamp house having a transparent top forming a table, film clamps at each side of the table to hold the film ends in position, a straight edge on the table between the clamps and against which the film sections may lie.

9. In a film mender, a lamp house having a transparent top forming a table, film clamps at each side of the table to hold the film ends in position, a straight edge on the table between the clamps and against which the film sections may lie, and means for adjusting the distance between said clamps.

10. In a film mender, a lamp house having a transparent top forming a table, film clamps at each side of the table to hold the film ends in position, a straight edge on the table between the clamps and against which the film sections may lie, and pressers for holding the film ends down on the table.

11. In a film mender, a lamp house having a transparent top forming a table, film clamps at each side of the table to hold the film ends in position, a straight edge on the table between the clamps and against which the film sections may lie, together with a "joint" clamp for holding the mended portion of the film until "set".

12. A film mending machine that comprises in combination with a table and a support therefor, a fixed and an adjustable film holding clamp mounted at one side of the table, a cutting mechanism located between said clamps, and a gage device coöperative with said film and cutting mechanism to adjust the location of said cutting mechanism according to the position of the film.

13. A film mending machine that comprises in combination with a table and a support therefor, a fixed and an adjustable film holding clamp mounted at one side of the table, a cutting mechanism located between said clamps, and a gage device coöperative with said film and cutting mechanism to adjust the location of said cutting mechanism according to the position of the film, and a third film holding clamp at the other side of said table, together with means for adjusting said third clamp toward and from the table.

14. A film mending machine that comprises in combination with a table and a support therefor, a fixed and an adjustable film holding clamp mounted at one side of the table, a cutting mechanism located between said clamps, and a gage device coöperative with said film cutting mechanism to adjust the location of said cutting mechanism according to the position of the film, and a third film holding clamp at the other side of said table, together with means for adjusting said third clamp toward and from the table, and means for holding the film ends at each side of the "break" down on the table while being repaired.

15. A film mending machine that comprises in combination with a table and a support therefor, a fixed and an adjustable film holding clamp mounted at one side of the table, a cutting mechanism located between said clamps, and a gage device coöperative with said film cutting mechanism to adjust the location of said cutting mechanism according to the position of the film, and a third film holding clamp at the other side of said table, together with means for adjusting said third clamp toward and from the table, and means for holding the film ends at each side of the "break" down on the table while being repaired, and means for holding the repaired portion immovable while "setting."

16. In a film mending machine a primary base adapted to be rigidly secured to a rewinding machine, a movable base mounted on said primary base and adapted to be pulled forward therefrom, a housing on said movable base, said housing including a transparent top forming a table, a source of illumination within said housing, a pair of bodily adjustable film gripping clamps mounted at each side of the table, and a third relatively fixed clamp mounted at one side of the table, a gage adjustably mounted on the table top to coöperate with the film, a cutting mechanism mounted at one side of the table top and connecting with said gage whereby the position of said cutting mechanism with relation to the film may be adjusted, and means for moving said gage and cutting mechanism to effect their adjustments.

17. In a film mending machine a primary base adapted to be rigidly secured to a rewinding machine, a movable base mounted on said primary base and adapted to be pulled forward therefrom, a housing on said movable base, said housing including a transparent top forming a table, a source of illumination within said housing, a pair of bodily adjustable film gripping clamps mounted at each side of the table, and a third relatively fixed clamp mounted at one side of the table, a gage adjustably mounted on the table top to coöperate with the film, a cutting mechanism mounted at one side of the table top and connecting with said gage whereby the position of said cutting mechanism with relation to the film may be adjusted, and means for moving said gage and cutting mechanism to effect their adjustments, a straight edge mounted on the table top and extending longitudinal thereof and against which the film parts may be brought.

18. In a film mending machine a primary base adapted to be rigidly secured to a rewinding machine, a movable base mounted on said primary base and adapted to be pulled forward therefrom, a housing on said movable base, said housing including a transparent top forming a table, a source of illumination within said housing, a pair of bodily adjustable film gripping clamps mounted at each side of the table, and a third relatively fixed clamp mounted at one side of the table, a gage adjustably mounted on the table top to coöperate with the film, a cutting mechanism mounted at one side of the table top and connecting with said gage whereby the position of said cutting mechanism with relation to the film may be adjusted, and means for moving said gage and cutting mechanism to effect their adjustments, a straight edge mounted on the table top and extending longitudinal thereof and against which the film parts may be brought, and pressers mounted over the table to engage and hold the film in contact with the table while being repaired.

19. In a film mending machine a primary base adapted to be rigidly secured to a rewinding machine, a movable base mounted on said primary base and adapted to be pulled forward therefrom, a housing on said movable base, said housing including a transparent top forming a table, a source of illumination within said housing, a pair of bodily adjustable film gripping clamps mounted at each side of the table, and a third relatively fixed clamp mounted at one side of the table, a gage adjustably mounted on the table top to coöperate with the film, a cutting mechanism mounted at one side of the table top and connecting with said gage whereby the position of said cutting mechanism with relation to the film may be adjusted, and means for moving said gage and cutting mechanism to effect their adjustments, a straight edge mounted on the table top and extending longitudinal thereof and against which the film parts may be brought, and pressers mounted over the table to engage and hold the film in contact with the table while being repaired, and a device for holding the repaired portion of the film immovable while "setting."

20. In a film mending machine, a primary base securable to a rewinding machine, cement container holders mounted on said primary base, a secondary base link connected to said primary base to be swung over said primary base or out from said primary base as the case may be, and a film repairing machine mounted on said secondary base.

21. In a film mending machine, a primary base securable to a rewinding machine, cement container holders mounted on said primary base, a secondary base link connected to said primary base to be swung over said primary base or out from said primary base as the case may be, and a film repairing machine mounted on said secondary base, said film mending machine including a housing having a transparent top forming a table, on which the film to be repaired is laid, and devices supported on said housing adjacent to said top for holding said film in position for repair, and other devices supported on said housing for trimming the film.

22. In a film mender, a housing having a transparent top forming a table, means for illuminating the interior of said housing, clamps having dowels or pins to enter the sprocket perforations of the film sections to hold the same in position, tension devices for holding the adjacent ends of the film sections on the table, a presser for holding the repaired part down on the table until "set," a gage for effecting the proper "match" of the two film sections, a cutting mechanism coöperative with the gage for trimming the torn ends of the film, substantially shown and described.

23. In a film mending device, a housing having a transparent part forming a table, means for illuminating the interior of said housing, and a film holding device for retaining the film in position on the table while being repaired, together with a transparent heat insulating member interposed between the illuminating means and the table.

24. In a film mender, a housing having a transparent top forming a table, means for illuminating the interior of said housing, and a mica sheet interposed between the table and the illuminating means to prevent overheating of the table and consequent injury to the film, clamps having dowels or pins to enter the sprocket perforations of the film sections to hold the same in position, tension devices for holding the adjacent ends of the film sections on the table, a presser for holding the repaired part down on the table until "set," a gage for effecting the proper "match" of the two film sections, a cutting mechanism coöperative with the gage for trimming the torn ends of the film, substantially shown and described.

EDWARD J. SCHAFER.

Witnesses:
    ARTHUR H. LEWIS,
    A. T. LEWIS.